US012278021B2

(12) United States Patent
Choy et al.

(10) Patent No.: US 12,278,021 B2
(45) Date of Patent: Apr. 15, 2025

(54) FLEXIBLE TRANSPARENT ELECTRODES OF SILVER NANOWIRES SINTERED WITH METAL OXIDE NANOPARTICLES

(71) Applicant: The University of Hong Kong, Hong Kong (HK)

(72) Inventors: Chik Ho Choy, Hong Kong (HK); Jinwook Kim, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 20 days.

(21) Appl. No.: 18/264,075

(22) PCT Filed: Jan. 20, 2022

(86) PCT No.: PCT/CN2022/072966
§ 371 (c)(1),
(2) Date: Aug. 3, 2023

(87) PCT Pub. No.: WO2022/018386
PCT Pub. Date: Sep. 9, 2022

(65) Prior Publication Data
US 2024/0038410 A1    Feb. 1, 2024

Related U.S. Application Data

(60) Provisional application No. 63/154,914, filed on Mar. 1, 2021.

(51) Int. Cl.
| | |
|---|---|
| *H01B 1/16* | (2006.01) |
| *B82Y 40/00* | (2011.01) |
| *H01B 13/00* | (2006.01) |
| *B82Y 30/00* | (2011.01) |

(52) U.S. Cl.
CPC ............... *H01B 1/16* (2013.01); *B82Y 40/00* (2013.01); *H01B 13/0016* (2013.01); *B82Y 30/00* (2013.01)

(58) Field of Classification Search
CPC ... H01B 3/30; H01B 1/16; H01B 1/02; H01B 1/22; H05B 33/28; B82Y 30/00; B82Y 40/00
USPC ..................................................... 252/514
See application file for complete search history.

(56) References Cited

U.S. PATENT DOCUMENTS

| | | | |
|---|---|---|---|
| 2008/0143906 A1 | 6/2008 | Allemand et al. | |
| 2012/0292725 A1 | 11/2012 | Christoforo et al. | |
| 2015/0137049 A1* | 5/2015 | Mittal | B05D 3/007 |
| | | | 252/514 |

(Continued)

FOREIGN PATENT DOCUMENTS

| | | | |
|---|---|---|---|
| CN | 102087884 A | * | 6/2011 |
| CN | 103700446 A | | 4/2014 |
| CN | 104575864 A | | 4/2015 |

(Continued)

OTHER PUBLICATIONS

Translation of CN102087884A. (Year: 2011).*

(Continued)

*Primary Examiner* — Tri V Nguyen
(74) *Attorney, Agent, or Firm* — Margaret A. Burke; Sam T. Yip; IDEA Intellectual Limited

(57) ABSTRACT

Disclosed is a transparent electrode made of a polymer matrix having semi-embedded therein a sintered silver nanowire composite comprising silver nanowires and metal oxide nanoparticles.

10 Claims, 3 Drawing Sheets

(56) References Cited

U.S. PATENT DOCUMENTS

2017/0349481 A1   12/2017  Lacroix et al.
2020/0081312 A1*   3/2020  Huang ............ H01L 31/022466

FOREIGN PATENT DOCUMENTS

| CN | 105204694 A | 12/2015 |
|---|---|---|
| CN | 107155365 A | 9/2017 |
| CN | 107251160 A | 10/2017 |
| CN | 108766628 A | 11/2018 |
| CN | 110634620 A | 12/2019 |

OTHER PUBLICATIONS

International Search Report and Written Opinion of the corresponding PCT application No. PCT/CN2022/072966 mailed on Apr. 19, 2022.
1st Office Action of the counterpart China patent application No. 202280018305.8 issued on Oct. 17, 2024.
Haoran Yu et al., "Use of solution-processed zinc oxide to prevent the breakdown in silver nanowire networks", Nanotechnology, 2020, vol. 31, No. 18LT01, p. 1-7.
Rui Zhu et al., "Fused Silver Nanowires with Metal Oxide Nanoparticles and Organic Polymers for Highly Transparent Conductors", ACS Nano, 2011, vol. 5, No. 12, p. 9877-9882.
EESR of the counterpart European patent application No. 22762333.7 issued on Dec. 2, 2024.

* cited by examiner

FLEXIBLE TRANSPARENT ELECTRODES OF SILVER NANOWIRES SINTERED WITH METAL OXIDE NANOPARTICLES

This application is a 371 application of the International Patent Application No. PCT/CN2022/072966 filed on Jan. 20, 2022, which claims priority from U.S. Provisional Patent Application Ser. No. 63/154,914 filed Mar. 1, 2021, and the disclosures of which are incorporated herein by reference in their entirety.

TECHNICAL FIELD

Disclosed are electrodes of metal nanowires sintered with metal oxide nanoparticles, methods related thereto, and devices containing the electrodes.

BACKGROUND

Flexible transparent electrode is an indispensable component in various emerging flexible optoelectronic devices, such as photovoltaics (PVs), light-emitting diodes (LEDs), photodetectors, sensors, and touch screen panels. Conventionally, iridium-doped tin oxide (ITO) has been widely used in most electrical/optical devices due to its superior conductivity and transparency. However, the ITO film is fabricated by costly deposition techniques equipped with ultra-high vacuum system and high power consumption. Even, indium of ITO is a rare and expensive material that cause to high manufacturing costs for entire applications. Besides, it has mechanically brittle nature, making it a grand challenging for integrating with emerging flexible devices. It is highly desirable to explore new flexible transparent alternatives of ITO electrode.

Among many promising flexible transparent electrodes, silver nanowires (Ag NWs) electrodes have demonstrated as a potential candidate for replacing the conventional ITO electrode. This is because it has not only excellent conductivity and transparency, but also mechanical flexibility described as ductile. Furthermore, Ag NW electrodes can be achieved by very simple, low cost and readily scalable solution processing methods such as spin coating, Mayer rod coating, doctor blade coating, deep coating, and air spraying nanowires dispersion.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Disclosed herein are transparent electrodes containing a polymer matrix having semi-embedded therein a sintered silver nanowire composite comprising silver nanowires and metal oxide nanoparticles.

In some embodiments, the metal oxide nanoparticles comprise at least one of sodium borohydride particles, lithium aluminium hydride particles, zinc oxide particles, titanium oxide particles, tin oxide particles, nickel oxide particles, and diisobutylaluminium hydride particles.

In some embodiments, the metal oxide nanoparticles comprise p-type metal oxide nanoparticles.

In some embodiments, the metal oxide nanoparticles comprise n-type metal oxide nanoparticles.

In some embodiments, the metal oxide nanoparticles have a high refractive index.

In some embodiments, the polymer matrix comprises at least one of polyimide, polydimethylsiloxane, and polyvinylpyrrolidone.

In some embodiments, the polymer matrix has a smoother surface roughness compared to another polymer matrix having semi-embedded therein an unsintered silver nanowire composite comprising silver nanowires and the same metal oxide nanoparticles.

In some embodiments, the polymer matrix has flexibility.

Also disclosed are foldable communication devices comprising the transparent electrodes disclosed herein. Also disclosed are methods of making a transparent electrode involving sintering a composite comprising silver nanowire, and metal oxide nanoparticles; and semi-embedding the sintered composite in a polymer matrix.

In some embodiments, the sintering comprises an ultraviolet ozone surface treatment.

In some embodiments, the sintering is carried out for 1 minute to 100 minutes.

In some embodiments, the sintering is carried out for 10 minutes to 30 minutes.

In some embodiments, the sintering is carried out after wetting with a sodium borohydride solution.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
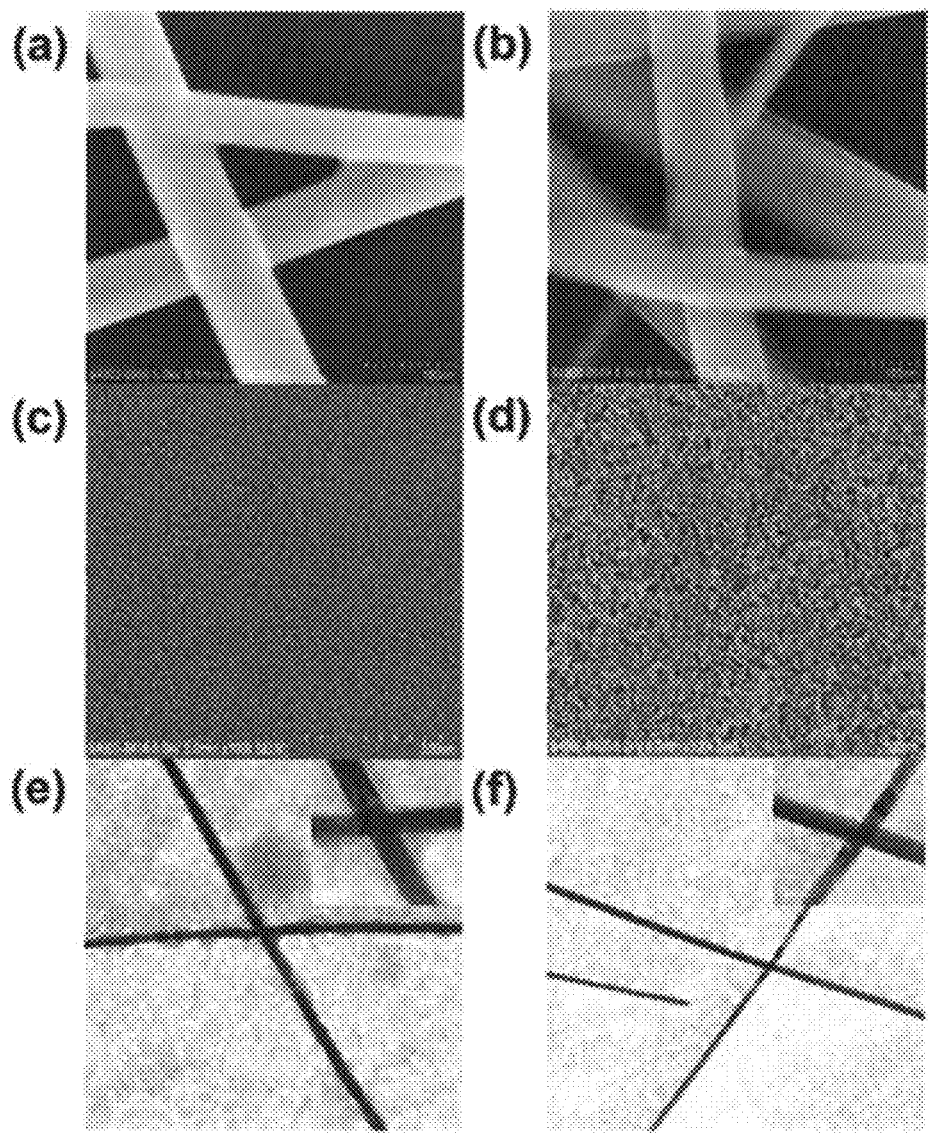
FIG. 1(a) and FIG. 1(b) SEM top-view images of showing the bare Ag NWs dispersed on a glass substrate with and without the chemical treatment, respectively.
FIG. 1(c) and FIG. 1(d) SEM top-view images of showing the treated and untreated ZnO NP films, respectively.
FIG. 1(e) and FIG. 1(f) TEM images of showing the treated and untreated Ag NW:ZnO NFS composites, respectively. The insets in FIG. 1(e) and FIG. 1(f) respectively are magnified in the regions of the cross-junctions between the Ag NWs.

However, Ag NW electrodes directly dispersed on flexible substrates show a stability issue led by its weak adhesion force to the substrates, which will be detached easily under mechanical operations (e. g. bending, stretching, etc.). Recently, embedding Ag NW electrodes into a polymer matrix have received attention as a new technique to successfully increase the adhesion force. The resulting embedded Ag NW electrodes exhibit significantly improved mechanical stability against a number of mechanical stress/strain. However, due to the fact that most part of individual Ag NWs are buried by the polymer matrix, its charge transportation with adjacent layers is extremely restricted to very narrow channels on the top surface of the embedded Ag NW electrodes. Additionally, it is worth pointing out that there are still loose chemical contacts at the junctions between the Ag NWs as well as incoherent insulating polyvinylpyrrolidone (PVP) ligand residues on 11001 facets of Ag NWs. These still will uncontrollably change its electrical property whenever under mechanical operations. Furthermore, Ag NW electrodes are expected to lose conductivity in the extended period as a result of their chemical instability. This instability is caused by the huge impact of atmospheric corrosion on Ag NW electrodes. It is important to note that the application of flexible devices is subjected to frequent mechanical operations with continuous electrical bias in humid conditions at the same time, while there has been very little report so far about the multiple operation stability of flexible Ag NW electrodes. Consequently, it is highly desirable to realize the strategic development of passivating the semi-embedded Ag NW in a polymer matrix by chemically stable materials, which simultaneously (1) offering better carrier transportation pathways with wide direct-contact surface, (2) eliminating incoherent PVP ligands from Ag NWs, (3) enhancing chemical integrations between the Ag NWs, and (4) passivating materials from moisture induced degradation for realizing the durable flexible Ag NW electrodes semi-embedded in a polymer matrix against the multiple operation.

As compared to a Ag NW:FEDOT type nanowire, this disclosure has different features particularly the robust stability of durable flexible Ag NW:oxide composite electrodes against the multiple operation such as repetitive mechanical bending, continuous electrical bias, and exposure to humid conditions at the same time. While FEDOT and oxide are both widely adopted materials in optoelectronic devices, the development of the two kinds of Ag NW based electrodes with FEDOT and oxide are both important to leverage and advance the evolution of flexible optoelectronics.

Reference is made to Table 1 for a comparison of differences between Ag NW:PEDOT and Ag NW:oxide.

ide is generally more useful for touch screen panels and flexible e-books that are frequently used in harsh mechanical, electrical, and/or chemical conditions. In addition, Ag NW:oxide can generally be used for both hole and electron injection ability in multilayered device applications.

As described herein, a new class of highly durable flexible transparent electrodes composed of Ag NW composites sintered with different kinds of metal oxide nanoparticles by a general solution approach, followed by semi-embedding the electrode composites in a polymer matrix. The approach of fabricating a metal network with excellent electrical conductivity and optical transparency, which can be used as, e.g., a transparent electrode. Such a transparent electrode can be used in many applications, including but not limited to display panels, organic light emitting diodes, organic solar cells, and organic photodetectors.

As for the general solution approach, we propose sodium borohydride, lithium aluminium hydride, and diisobutylaluminium hydride. Interestingly, the solution approach is universally applicable to both n- and p-type metal oxide nanoparticles in the composite electrodes. The contributions of the universal chemical approach to different composite electrodes are (i) removal of the incoherently resistive capping ligands (e.g., PVP) around Ag NWs; (ii) pinhole-free surface characteristics of various metal oxide nanoparticle films by merging nanoparticle together; (iii) sintering between Ag nanowires and different metal oxides nanoparticles via the co-ordination bond formation, respectively. In addition, with semi-embedding the composite electrode in a polymer matrix, the whole conductive surface can be ensured for efficient charge transportation with the adjoining functional layers in the multilayered optoelectronic devices such as PVs, and LEDs. Moreover, we can tune/improve the optical properties of the composite by using high refractive index of metal oxide nanoparticles. In this regard, we can easily create an interface with high contrast in refractive index.

Advantageous features of the electrodes described herein include one or more of:
1. Simple solution process and cost-effectiveness: with the simpler and cheaper equipment as compared to complex and costly evaporation system, there are many different solution processing techniques capable of producing high-quality films to achieve desired coatings.
2. Green process: room temperature, room atmosphere and non-toxic process.
3. Favorable to Large area process.

TABLE 1

A comparison of important differences in between Ag NW:PEDOT and Ag NW:oxide

| | Ag NW:PEDOTs | Ag NW:oxide |
|---|---|---|
| Sheet Resistance | ~5 ohm/sq | ~20 ohm/sq |
| Transparency | ~92% at visible region | ~90% at visible region |
| Root mean square roughness | ~1 nm | ~10 nm |
| Stability | average (not particular stable against electrical and chemical tests) | Robust (simultaneously against mechanical, electrical, and chemical tests at the same time) |
| Work function | ~5.0 eV favorable for hole injection in multilayered devices. | Favorable both ~4.0 eV for electron injection and ~5.0 eV for hole injection depending on oxide materials in multilayered devices |

Overall, Ag NW:PEDOT shows more useful for applications that need high surface smoothness and high quality of electrical/optical properties (e. g. LEDs) while Ag NW:ox- 4. Universally applicable process to form the transparent flexible electrode with various metal oxides: the whole fabrication process including the chemical treatment is universally applicable to both n- and p-type metal oxides with the Ag NWs as composite electrodes.

5. Robust multiple operation stability: enhancing the stability against numerous mechanical flexibility test with continuous electrical bias under exposure to humid conditions at the same time.

6. Wide carrier transportation channels with adjacent layers.

This disclosure of the hybrid Ag nanowires with metal oxide nanoparticle semi-embedded in a polymer matrix by the general solution approach is resolves, at least in part, one or more of the below several problems for the hybrid electrode systems:

1. The electrical resistance problem at the cross-junctions between Ag NWs caused by the firmly attached insulating PVP along floor facets of Ag NWs in nanoscopic scale.
2. The pinholes of metal oxide nanoparticles in the films.
3. Inert interaction between Ag nanowires and metal oxide nanoparticles.

This disclosure solves/addresses, at least in part, the above several problems by at least one of:

1. The insulating PVP on the facets of Ag NWs is removed by the chemical Ag nanowire treatment. Thus, the number of the electrical resistance between Ag nanowires is decreased.
2. The pinholes of metal oxide nanoparticles in the films are disappeared due to the merger and rearrangement between nanoparticles by the chemical treatment.
3. Strong coordinate bonds are created between Ag NWs and metal oxide nanoparticles.

Consequently, those three achievements in the composites by the general solution approach is contributed to the durable stability against the multiple loaded (electrical bias, bending and high humidity) operation.

Since a solution process with typical processing times of 30-300 s, in some embodiments there is an issue for changing bottom layers in embodiments where bottom layers are employed. In such embodiments, there is limited use with vulnerable materials in liquid alcohol-water based solution. However, the fabrication of device aims, in some embodiment, for water free or substantially water freed processes to eliminate/minimize the moisture/water induced changes in underneath layered device structures.

The formation of the flexible composite electrodes semi-embedded in a polymer matrix was entirely accomplished in the solution process. Firstly, Ag NWs have been dispersed (e. g. by spin-coating) on rigid supporting substrates with smooth surface roughness (e. g. silicon wafer, glass, etc.) after ultraviolet-ozone (UVO) surface treatment of the substrates. Typically, UV light has at least one of two types of wavelength: 185 and 254 nm. On top of the as-prepared Ag NW electrodes, the incorporation of different types of metal oxide nanoparticles has been investigated by simple solution process such as spin-coating. Hereafter, zinc oxide nanoparticles (ZnO NFS) serve as a representative case for further discussion. After that, the chemical treatment on the hybrid Ag NW:ZnO NFS simultaneously provides three unique effectiveness (i) the removal of PVP ligands from Ag nanowires; (ii) pinhole-free surface morphology of ZnO NFS in the film; (iii) creation of coordinate bonds between Ag NWs and ZnO NPs. It is important to note that the chemical treatment can be universally applicable to many different hybrid Ag NW electrode system with either n- or p-type metal oxide nanoparticles such as ZnO, titanium oxide ($TiO_2$), and tin oxide ($SnO_2$) for the n-type and nickel oxide (NiO) for the p-type. After the chemical treatment, embedding composite electrodes in a polymer matrix is performed such as colorless polyimide (CPI), polydimethylsiloxane (PDMS), etc.

FIG. 1(a) shows a scanning electron microscope (SEM) top-view image of showing Ag NW electrodes on a glass substrate after the chemical treatment. It can be clearly seen that there are no PVP ligands remained around the surface of Ag NWs while the incoherent PVP ligands still firmly attached to the untreated surface of Ag NWs as indicated in FIG. 1(b).

As shown in Table 2, the average reduction of the sheet resistance with reference to 10 samples of the untreated bare Ag NW electrodes is confirmed after the universal chemical treatment mostly due to the direct physical contacts between the Ag NWs by removing the PVP ligands.

TABLE 2

A summary of the average reduction of the sheet resistance with reference to 10 samples of the bare Ag NW electrodes before and after the chemical treatment

| Before the chemical treatment | After the chemical treatment |
| --- | --- |
| 45 ohm/sq | 36 ohm/sq |

Figure 2:
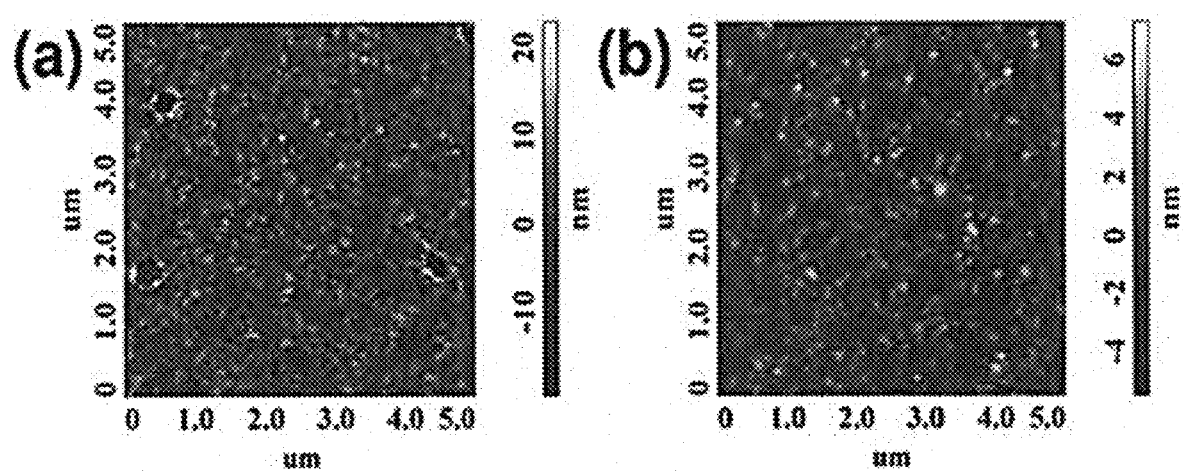
FIG. 2(a) depicts AFM images of showing ZnO NF films before the universal chemical treatment.
FIG. 2(b) depicts AFM images of showing ZnO NF films after the universal chemical treatment. The untreated ZnO NF film shows 4.86 nm and 42.32 nm of the RMS and peak-to-valley roughness respectively. In contrast, the treated ZnO NF film exhibits 1.52 nm and 12.81 nm of the noticeably decreased RMS and peak-to valley roughness, respectively.

Meanwhile, it has been observed that the ZnO NP films formed on UVO-treated rigid substrates (e.g. silicon wafer, glass, etc.) have many pinholes ranged up to ~75 nm in the width between the ZnO NP clusters as shown in FIG. 1(d). In contrast, with the chemical treatment, these pinholes disappeared and the ZnO NP films show surface and continuous morphology as the SEM image shown in FIG. 1(c). The atomic force microscope (AFM) measurement of the untreated and treated ZnO NP films was consistent with the SEM results as explained in FIGS. 2(a) and 2(b), respectively. The root mean square (RMS) roughness significantly decreases from 4.86 nm to 1.52 nm and peak-to-valley roughness from 42.3 nm to 12.8 nm via the treatment.

Figure 3:
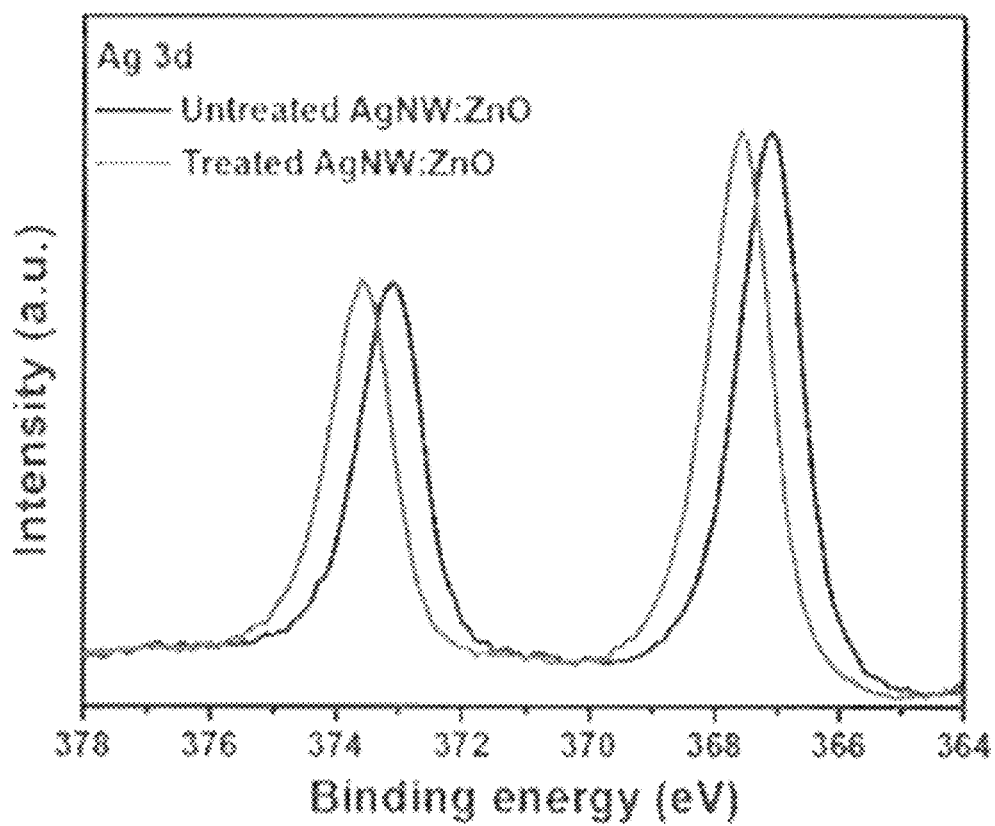
FIG. 3 depicts a XFS spectra of Ag 3d for the treated and untreated Ag NW electrode composites with ZnO NPs by the chemical treatment. Ag $3d_{5/2}$ and Ag $3d_{3/2}$ peaks after the treatment were shifted toward higher binding energies of 367.6 and 373.6 eV from 367.1 and 373.1 eV, respectively.

Regarding that the untreated Ag NW electrode composites show poor contacts without the chemical interaction between Ag NWs and ZnO NFS. It is confirmed by TEM image in FIG. 1(f) showing that individual ZnO NP were weakly interactive with entire Ag NWs as well as at the cross junctions between Ag NWs. Distinguishably, after the chemical treatment, there is reinforced interaction between ZnO NPs and Ag NWs not only along the Ag NWs but also at the cross junctions as seen TEM image of FIG. 1(e). These attractive forces could be explained by the new chemical coordinate bonds between Ag NWs and ZnO NFS as confirmed by the X-ray photoelectron spectroscopy (XPS) in FIG. 3, showing the positive binding energies shift of Ag $3d_{5/2}$ core-electrons of the composites after the treatment.

The details of the process of fabricating flexible Ag NW electrode composites sintered with metal oxide nanoparticles follows the chemical treatment as follows, in one embodiment.

Ag NW electrodes and followed by metal oxide nanoparticles deposited on rigid supporting substrate with UVO surface treatment for 20 min. with As for the chemical treatment, used is 0.5 M of sodium borohydride solution dissolved in mixed solvent of Dl water:ethanol 8:2 ratio by the experimental optimization process. First of all, wetting the surface of as-prepared hybrid Ag NW:metal oxide nanoparticles with the prepared sodium borohydride solution for prolonged 30-300 seconds. Subsequently, various methods such as spin-coating, Mayer rod, and blowing-off methods would be capable of taking the solution away from the surface.

Achievable by the disclosure herein allows for the durable Ag NW electrodes at least semi-embedded in a polymer matrix against multiple operation environments such as repetitive mechanical bending, continuous electrical bias, and exposure to humid conditions at the same time. There is almost no reported work for the stability of flexible electrodes under the multiple operation.

Although the examples provided herein describe silver nanowires, this is for exemplary purposes only. The metal nanowires can be silver, gold, aluminum, platinum, palladium, or an alloy thereof, though embodiments are not limited thereto. The metal oxide nanoparticles can be the same or different from the metal of the metal nanowires, though in most embodiments is different.

The metal oxide nanoparticles have a size suitable to create strong bonds with the metal nanowires. In one embodiment, the metal oxide nanoparticles have a size where at least about 95% by weight of the particles have a size from about 1 nm to about 500 nm. In this connection, size refers to average cross-section of a particle, such as diameter. In another embodiment, the metal oxide nanoparticles have a size where at least about 95% by weight of the particles have a size from about 5 nm to about 250 nm. In yet embodiment, the metal oxide nanoparticles have a size where at least about 95% by weight of the particles have a size from about 10 nm to about 100 nm. In another embodiment, about 100% by weight of the metal oxide nanoparticles have any of the sizes described above.

Embodiments are also drawn to methods of fabricating a network of metal nanowires having metal nanoparticles present at the junctions where nanowires meet, as well as networks of metal nanowires fabricated by such methods. A metal nanowire network of the subject invention can have metal nanoparticles at the junctions where nanowires meet within the network.

Unless otherwise indicated in the examples and elsewhere in the specification and claims, all parts and percentages are by weight, all temperatures are in degrees Centigrade, and pressure is at or near atmospheric pressure.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A transparent electrode, comprising:
    a polymer matrix having semi-embedded therein a sintered silver nanowire composite comprising silver nanowires and metal oxide nanoparticles, wherein the metal oxide nanoparticles comprise n-type metal oxide nanoparticles selected from the group consisting of zinc oxide nanoparticles and titanium oxide nanoparticles,
    wherein the silver nanowires and the metal oxide nanoparticles are sintered via ultraviolet ozone surface treatment after being wetted with a sodium borohydride solution to form the sintered silver nanowire composite, and
    wherein there are no polyvinylpyrrolidone ligand on the surface of the transparent electrode.

2. The transparent electrode according to claim 1, wherein the metal oxide nanoparticles have a high refractive index.

3. The transparent electrode according to claim 1, wherein the polymer matrix comprises at least one of polydimethylsiloxane and polyvinylpyrrolidone.

4. The transparent electrode according to claim 1, wherein the polymer matrix has a smoother surface roughness compared to a polymer matrix having semi-embedded therein an unsintered silver nanowire composite comprising silver nanowires and metal oxide nanoparticles, wherein the metal oxide nanoparticles comprise n-type metal oxide nanoparticles selected from the group consisting of zinc oxide nanoparticles and titanium oxide nanoparticles.

5. The transparent electrode according to claim 1, wherein the polymer matrix has flexibility.

6. A foldable communication device comprising the transparent electrode according to claim 1.

7. A method of making a transparent electrode, comprising:
    sintering a composite comprising silver nanowire, and metal oxide nanoparticles, wherein the metal oxide nanoparticles comprise n-type metal oxide nanoparticles selected from the group consisting of zinc oxide nanoparticles and titanium oxide nanoparticles; and
    semi-embedding the sintered composite in a polymer matrix,
    wherein the sintering is carried out after wetting with 0.5 M sodium borohydride solution,
    wherein the sodium borohydride solution is dissolved in mixed solvent of DI water:ethanol 8:2 ratio, and
    there are no polyvinylpyrrolidone ligand on the surface of the transparent electrode.

8. The method according to claim 7, wherein the sintering comprises an ultraviolet ozone surface treatment.

9. The method according to claim 7, wherein the sintering is carried out for 1 minute to 100 minutes.

10. The method according to claim 8, wherein the sintering is carried out for 10 minutes to 30 minutes.

* * * * *